J. HANMAN.
AUXILIARY AIR VALVE FOR INTERNAL COMBUSTION ENGINES.
APPLICATION FILED SEPT. 29, 1917.
1,298,935.
Patented Apr. 1, 1919.
2 SHEETS—SHEET 1.
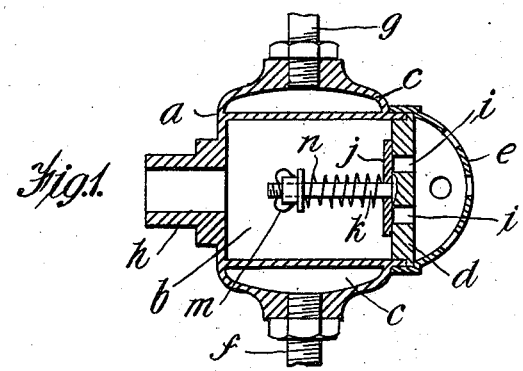
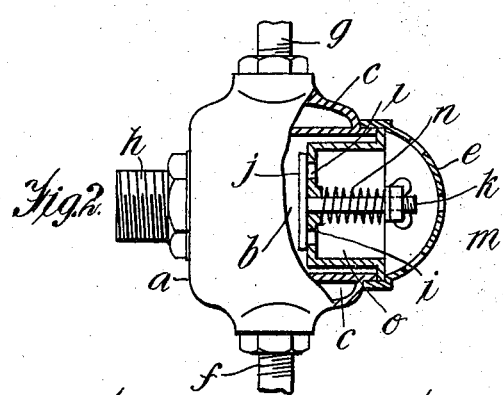
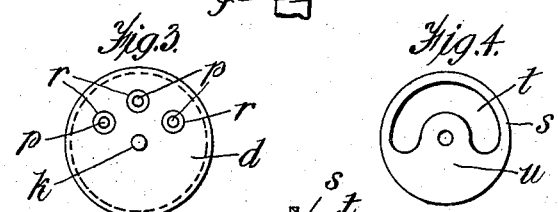
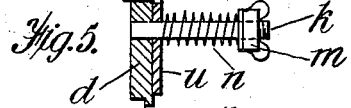
INVENTOR
JOHN HANMAN
By
Attorney.

INVENTOR
JOHN HANMAN

UNITED STATES PATENT OFFICE.

JOHN HANMAN, OF BAYSWATER, LONDON, ENGLAND, ASSIGNOR TO PIERRE BERNARD BAUSCH AND FRANK FREDERICK PERSHKE, TRADING UNDER THE FIRM NAME OF PRICE SERVICE & COMPANY, OF LONDON, ENGLAND.

AUXILIARY AIR-VALVE FOR INTERNAL-COMBUSTION ENGINES.

1,298,935.  Specification of Letters Patent.  Patented Apr. 1, 1919.

Application filed September 29, 1917. Serial No. 194,026.

*To all whom it may concern:*

Be it known that I, JOHN HANMAN, a subject of the King of Great Britain and Ireland, and resident of Bayswater, county of London, England, have invented a certain new and useful Improvement in or Relating to Auxiliary Air-Valves for Internal-Combustion Engines, of which the following is a specification.

This invention which relates to internal combustion engines has for its object to cause petrol or other liquid fuel to flow freely, increasing the efficiency of the engine, gaining more power and mileage with a reduction of fuel, by supplying hot air to the induction from and by a valve heated by exhaust, hot air or water.

The invention is illustrated by the accompanying sheets of drawings, in which:—

Figure 1 is a vertical section of an auxiliary valve constructed in accordance with the invention.

Fig. 2 is an elevation, partly in section, showing a modification of the non-return valve thereof.

Figs. 3, 4, 5 and 6 are detailed views, hereinafter referred to, of a further modification of non-return valve.

In carrying out the invention, the body $a$ of the valve as a whole, is provided with a centrally disposed collecting chamber $b$, with a surrounding jacket $c$, and such collecting chamber $b$ is provided with a non-return valve opening to said chamber, said valve being carried by a flanged disk $d$ attached to the valve body, said disk $d$ also carrying a semi-spherical and perforated cap or cover $e$, Figs. 1 and 2.

The jacket $c$ surrounding the collecting chamber $b$ is provided with inlet pipe $f$ and outlet pipe $g$, said inlet pipe $f$ being connected with exhaust or to a suitable hot air or water supply so that air sucked in through the perforated cap or cover $e$ and the non-return valve into the collecting chamber $b$ is heated therein by the heat transmitted from the exhaust, hot air or water before passing through the outlet $h$ of said collecting chamber $b$ to the induction, said outlet $h$ being connected to said induction in any suitable manner.

The valve, according to one arrangement, consists of holes $i$ in the flanged disk $d$, and a disk $j$ loosely mounted on a central spindle $k$ on said flanged disk $d$ and normally covering said holes $i$, said spindle $k$ which extends into the collecting chamber $b$, Fig. 1, being screw-threaded to receive a nut $m$ which bears on a spring $n$ encircling the spindle $k$ and bearing against the disk or shiftable air regulating member $j$ covering the holes in the flanged disk $d$.

Or, as shown in Fig. 2, instead of the flanged disk $d$, a flanged cup $o$ may be employed, the body of said cup extending into the collecting chamber $b$. In this case the spindle $k$ is slidably mounted in the end of the cup $o$ and carries at its inner end and outside the cup $o$ the disk $j$ which covers the holes $i$ now arranged in the bottom of the cup $o$, the spring $n$ which encircles said spindle $k$ now being arranged between the nut $m$ and the bottom of the cup.

Or, as shown in Figs. 3 to 6, ball or like spring-controlled valves may be employed, each ball $p$ and its spring $q$ being carried in a casing $r$ adapted to be inserted in the flanged disk $d$, on the spindle $k$ of which is loosely mounted another shiftable air regulating member in the form of a disk $s$ provided with a semi-circular slot $t$, said disk $s$ which is controlled by nut $m$ and spring $n$ on said spindle $k$ serving to shut off the ball valve $p$ when the plain portion $u$ of said disk $s$ is turned to cover them.

Figure 7:
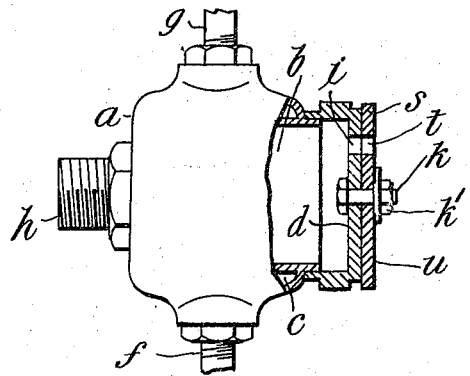
Fig. 7 is a side view, partly in elevation and partly in section, illustrating a still further modified arrangement of the fresh air inlet or valve.
Figures 8, 9:
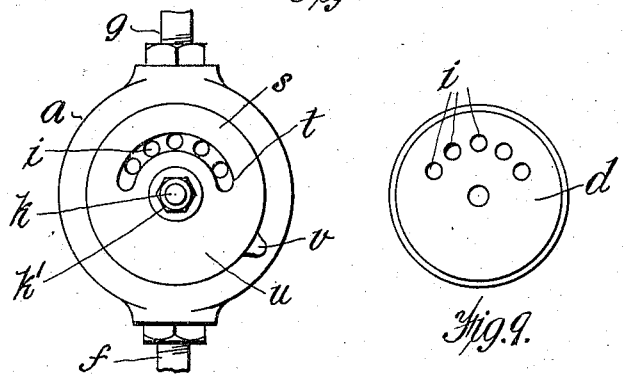
Fig. 8 is a front view of said Fig. 7.
Fig. 9 is a front view of the flanged disk thereof, shown detached.
Figure 10:
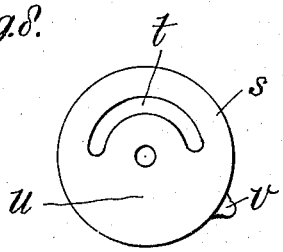
Fig. 10 is a front view of the slotted and rotatable disk thereof, shown detached.

Referring now to the arrangement shown by Figs. 7 to 10 which illustrates the auxiliary air valve as constructed for control from the dashboard or driver's seat by means of a Bowden wire or other suitable means. In this arrangement of auxiliary valve, the perforated cap or cover $e$ employed in the other arrangements of auxiliary air valves shown is now dispensed with and the disk $d$ provided with a series of perforations or holes $i$ to which fresh air is admitted by way of the semi-circular slot $t$ in a disk $s$ rotatably mounted on the screwed spindle $k$, said disk $s$ being prevented from moving away from the disk *d* by a nut *k'* on said spindle *k*.

The disk *s* is provided with a nib or projection *v* adapted to be connected to the Bowden wire or other means operable by the driver of a car, so that said disk *s* may be rotated to cover by its plain portion *u* one, two or more of the holes or perforations *i* in the disk, and thus control the amount of fresh air admitted to the chamber *b* wherein it is heated before passing through outlet *h* to induction.

Having now described my invention, what I claim as new and desire to secure by Letters Patent of the United States is:—

1. An air heating unit for internal combustion engines including a casing having a hollow wall portion and an interior air heating chamber surrounded thereby, a heated air outlet nipple formed on the casing and having its axis coincident with the longitudinal axis of the air heating chamber, radially disposed heated fluid conducting pipe connections leading into the hollow wall portion of the casing, and an air regulating device detachably fitted to the casing at the side of the air chamber opposite the heated air outlet nipple and constituting one of the walls of the air heating chamber.

2. An air heating unit for internal combustion engines consisting of a double walled tubular body, one end of which is formed with an offset nipple portion and the other end of which is open, heated fluid pipe connections for the double walled body, and an air regulating device adapted to be fitted into the open end of the unit to provide a closure wall for the air heating chamber, and whereby the supply of air thereto to be heated may be regulated.

In testimony whereof I have affixed my signature in presence of two witnesses.

JOHN HANMAN.

Witnesses:
 ROBT. HUNTER,
 BENJ. THOS. KING.

Copies of this patent may be obtained for five cents each, by addressing the "Commissioner of Patents, Washington, D. C."